United States Patent [19]
Schoepe

[11] 3,907,341
[45] Sept. 23, 1975

[54] IRRIGATION PIPE AND COUPLING CONSTRUCTION

[76] Inventor: Adolf Schoepe, 1620 N. Raymond Ave., Fullerton, Calif. 31926

[22] Filed: Oct. 23, 1974

[21] Appl. No.: 517,192

[52] U.S. Cl. .................. 285/236; 285/15; 285/371; 285/330
[51] Int. Cl.² .......................................... F16L 21/00
[58] Field of Search ......... 285/18, 5, 236, 371, 398, 285/DIG. 9, DIG. 14, 330, 321, 239, 156

[56] References Cited
UNITED STATES PATENTS
| | | | |
|---|---|---|---|
| 773,047 | 10/1904 | Bayles | 285/330 |
| 2,810,594 | 10/1957 | Walsh et al. | 285/DIG. 9 |

FOREIGN PATENTS OR APPLICATIONS
| | | | |
|---|---|---|---|
| 448,644 | 4/1968 | Switzerland | 285/DIG. 14 |
| 678,957 | 1/1930 | France | 285/236 |
| 534,884 | 10/1931 | Germany | 285/236 |

*Primary Examiner*—Andrew V. Kundrat
*Attorney, Agent, or Firm*—Mahoney, Schick & Cislo

[57] ABSTRACT

Axially opposed ends of preferably fiberglass pipes are molded partially telescoped over preferably metal coupling sleeves having circumferentially spaced and axially projecting finger portions which are generally hook-shaped in radial cross-section. The sleeve hook-shaped finger portions are positioned circumferentially interfitting and circumferentially aligned with a split retainer ring through the finger portions retaining the same against axial and radial separation. A resilient sleeve is telescoped over and between the pipe ends secured to the pipes by clamping rings and completing the coupling. Various take-off members may be molded in the resilient sleeve fluid communicating with the interior of the pipes through voids provided axially adjacent the coupling sleeve finger portions.

6 Claims, 6 Drawing Figures

IRRIGATION PIPE AND COUPLING CONSTRUCTION

BACKGROUND OF THE INVENTION

This invention relates to a unique pipe and coupling construction which is particularly useful for irrigation pipe installations. More specifically, the pipe and coupling construction of the present invention is particularly adaptable to irrigation pipe installations wherein quite long lengths of coupled pipe are installed to be movable on a constant or intermittent basis over large areas of fields of growing crops. The prime requirements in such moving pipe installations are joints between the pipe lengths which are relatively strong, moving torque resistant and relatively watertight, while still having a moderate degree of flexibility.

In a typical irrigation pipe installation, and particularly of the type wherein the lengths of coupled pipes are movable over the ground areas, certain if not all of the pipe lengths have surrounding wheels mounted thereon, that is, the pipe lengths extending through the hub or axis of the wheel. The wheels are located intermediate the lengths of pipe so as to support the coupled pipe lengths spaced relatively evenly above the ground surface. Furthermore, in some installations, a series of coupled pipe lengths will be arranged as radial spokes somewhat simulating a mammoth wheel with the various lengths of coupled pipes rotating around the common center so as to cover the ground area therebeneath. In other installations, spaced, parallel, pipe lengths of coupled pipes are movable as lines across a square or rectangular ground area to thereby cover the same.

In any case, in these moving pipe installations, various power units are installed adjacent the pipe lengths and supply the motivation forces thereto. It can be seen, therefore, that motivating forces for moving the pipe lengths supplied at a given location must be transmitted through the coupled pipe lengths for various distances along the pipe lengths. At the same time, as the pipe lengths are so moved, they are moving over cultivated land having moderate degrees of unevenness.

In such described environment, the coupled pipe lengths necessarily are subjected to various degrees of torque forces in order to maintain the required movement and, most importantly, these torque forces must likewise be transmitted between pipe lengths through the end couplings thereof. In addition, with the moderate surface unevenness of the ground over which the pipes move, the pipe couplings are also subjected to side or radial movements which not only add additional torque forces, but also introduce the requirement of moderate flexibility of the pipe couplings while remaining relatively watertight.

It can be seen, therefore, that the requirements of the pipe couplings in irrigation pipe installations are relatively severe for successful installations usable over relatively long periods of time. Despite this, however, the pipe and pipe coupling constructions must be of maximum simplicity so that the installations can be provided at an economically feasible cost. Furthermore, the actual coupling operations of the pipe lengths, that is, the actual assembly of the couplings into operational form must be of maximum simplicity so as not to cause the expenditure of prohibitive amounts of time and labor.

OBJECTS AND SUMMARY OF THE INVENTION

It is, therefore, an object of this invention to provide a unique irrigation pipe and coupling construction, although conveniently usable for many forms of pipe installations, which is particularly adaptable to moving irrigation pipe installations of the type hereinbefore described. The pipe and coupling construction according to the principles of the present invention provides the inherent strength and torque resistance for use over long periods of time without costly failures. Furthermore, these strength and torque-resistant features are combined with a moderate degree of flexibility while retaining assembly and watertight transmission, thereby satisfying the important requirements in an efficient manner.

It is a further object of this invention to provide a unique irrigation pipe and coupling construction of the foregoing general type which, due to its inherent structural features, may make use of virtually any pipe length structure or composition. Each of the pipe lengths, regardless of the particular pipe composition, has special metal coupling sleeves installed at the ends thereof, the sleeves being provided with cooperably interengaging fingers which are brought into coupling cooperation with similarly constructed sleeves of other pipe lengths merely through axial movements of the pipe lengths into general circumferential alignment. Once the finger interengagement and general alignment is established, such assembly is retained by installation of a retention ring and the fluid-tight coupling is completed by a joint covering fluid-tight sleeve clamped in place spanning the particular coupled pipe ends. Thus, the strengths of the couplings between pipe length ends is not dependent on any particular composition of pipe and a wide variety of pipe length constructions may be used without regard to the end coupling requirements.

It is still a further object of this invention to provide a unique irrigation pipe and coupling construction having all of the foregoing advantageous features, yet which is extremely simple in original fabrication and permits pipe coupling assembly with a minimum amount of time and labor expenditure. The specially formed coupling sleeves may be quickly installed in the ends of the pipe lengths in any usual sound construction manner compatible with the particular pipe composition material. For instance, the basic pipe lengths can be formed of plastics, such as fiberglass reinforced plastics, and the pipe ends may be molded partially telescoping the metal coupling sleeves, all in a relatively simple and expeditious manner. Once the coupling sleeves have been so installed, the actual coupling assembly is relatively quickly accomplished with a minimum of skill as hereinbefore described.

It is an additional object of this invention to provide a unique irrigation pipe and coupling construction which also simplifies the installation of the various take-offs required for the irrigation pipe use, such as take-offs required for sprinklers and drains. The take-offs for the water distribution from the water flowing through the pipes may be installed directly at the pipe length connecting or coupling locations and are not required to be installed intermediate the pipe lengths directly in the walls of the pipe lengths. For instance, in the agricultural irrigation systems, the take-off members for mounting the usual water disbursing sprinklers may be integrated directly in the cover sleeve serving to complete the particular coupling and through a unique structure of the coupling sleeves of the particular coupling, such take-off members freely fluid or liquid communicate with the interiors of the pipe lengths. Similar take-off members may be likewise integrated directly into the coupling cover sleeves for installation of drains and the like so that in all cases, it is unnecessary to mount take-off members other than at the coupling sleeves with the consequent added obvious convenience and versatility.

Other objects and advantages of the invention will be apparent from the following specification and the accompanying drawings which are for the purpose of illustration only.

Figure 1:
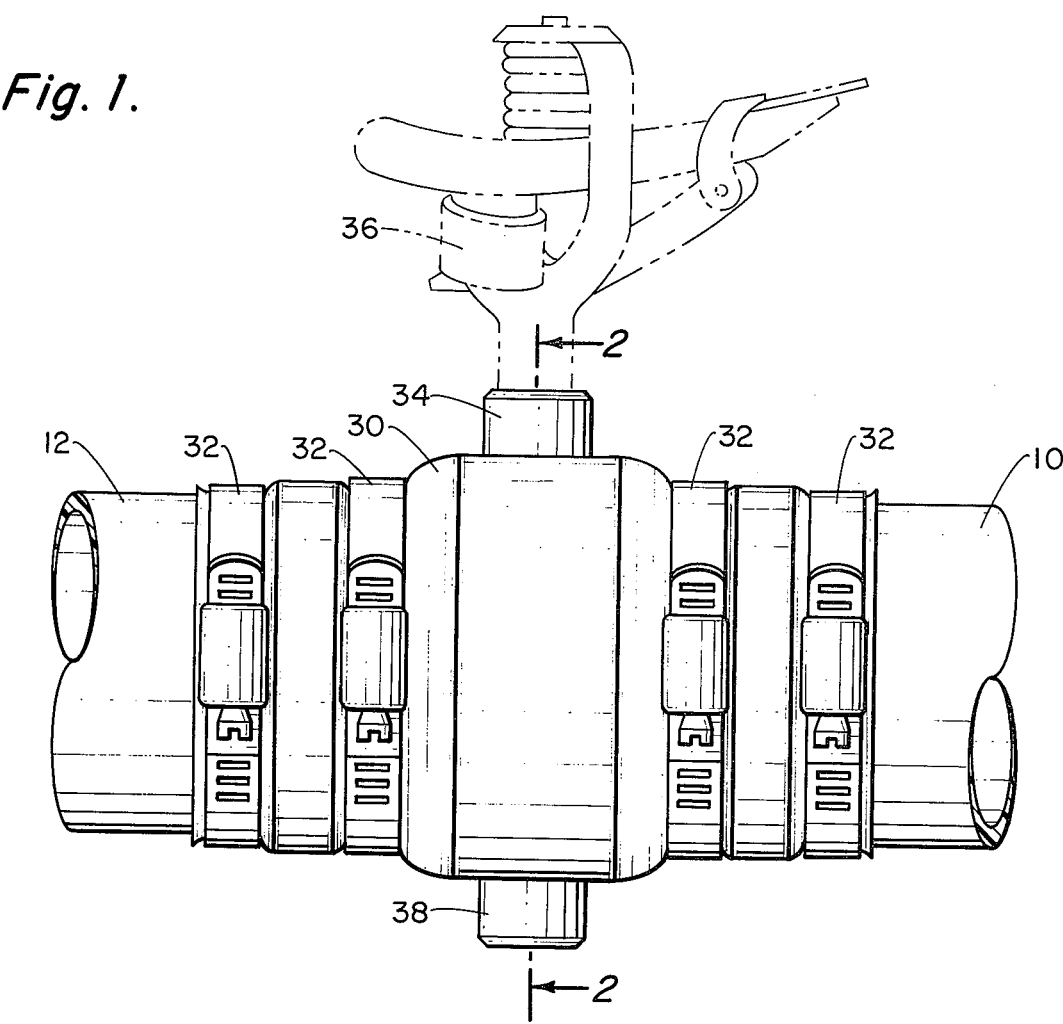
FIG. 1 is a fragmentary, side elevational view showing the ends of two coupled pipe lengths of an irrigation system incorporating a preferred embodiment of the pipe and coupling construction of the present invention in fully assembled condition.

DESCRIPTION OF THE BEST EMBODIMENT CONTEMPLATED:

Referring to the drawings, a preferred embodiment of the irrigation pipe and coupling construction of the present invention is illustrated in the environment of an irrigation system, that is, as would be used for distributing water to growing crops for irrigation thereof in agriculture. As will be clearly evident from the following descriptions and discussions, however, the pipe and coupling construction of the present invention is fully applicable to many fluid pipe distribution systems and is particularly useful in systems where the combination of coupling torque resistant strength and flexibility is required. Thus, it is not intended to limit the principles of the present invention to the particular embodiment shown and described, nor solely to irrigation systems, but rather, such principles should be broadly construed.

Figure 2:
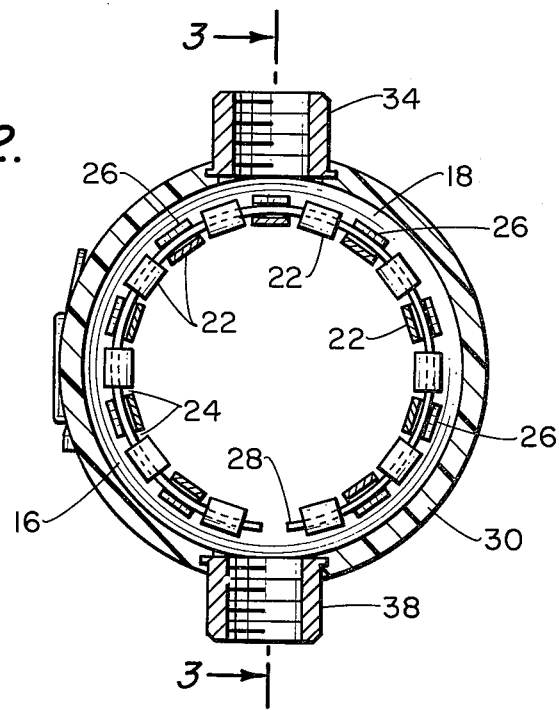
FIG. 2 is a vertical sectional view looking in the direction of the arrows 2—2 in FIG. 1.
Figure 3:
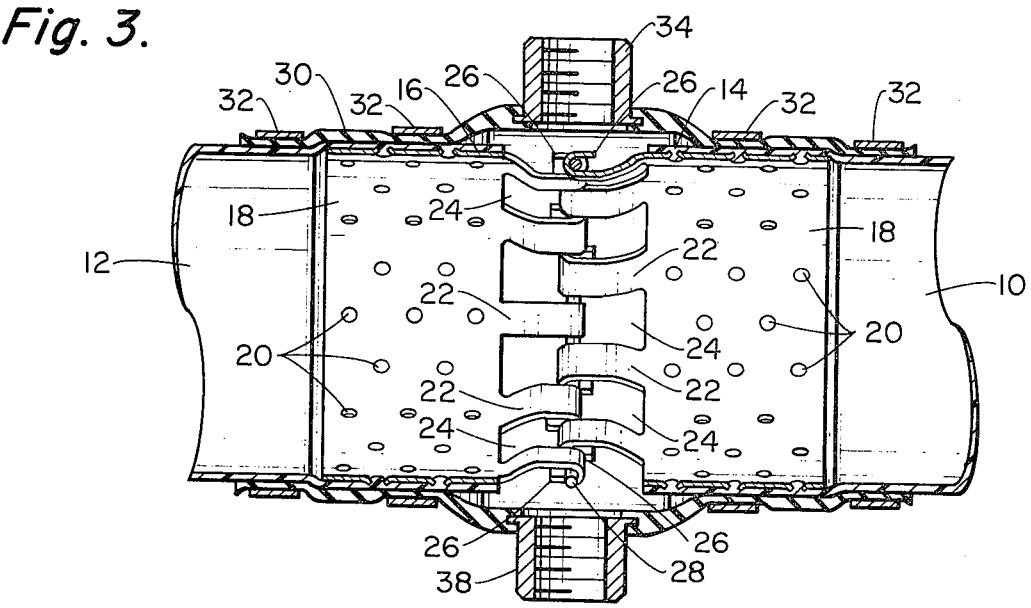
FIG. 3 is a fragmentary, vertical sectional view looking in the direction of the arrows 3—3 in FIG. 2.

As shown particularly in FIGS. 1 through 3, the pipe and coupling construction in fully assembled condition includes two lengths of conventional pipe 10 and 12 having generally axially aligned ends 14 and 16, respectively. The pipe ends 14 and 16 partially telescope generally identical metal coupling sleeves generally indicated at 18 secured to the pipe ends, in this case, preferably by the pipe ends being molded thereto with the aid of a series of sleeve holes 20. Each of the coupling sleeves 18 projects axially from its respective pipe end 14 or 16 terminating axially outwardly of its pipe end in a multiplicity of preferably equally circumferentially spaced, generally axially extending hook-shaped finger portions 22.

The coupling sleeve finger portions 22 have their hook shapes in generally radial cross-section with the hook shapes preferably opening reversely, that is, axially toward the major portion of the particular coupling sleeve 18 and the pipe length 10 or 12 to which the coupling sleeve is secured. Furthermore, the finger portions 22 are preferably circumferentially equally spaced a distance slightly greater than one finger portion circumferential width forming axially extending voids 24 circumferentially between the finger portions having axial depths markedly greater than hook parts 26 of such finger portions. Thus, as particularly shown in FIGS. 2 and 3, with the pipe ends 14 brought axially into position for coupling, the hook-shaped finger portions 22 of the coupling sleeves 18 are positioned axially and circumferentially interfitting, one finger portion of one coupling sleeve interfitting circumferentially between and partially received axially in the void 24 between two of the finger portions of the other coupling sleeve.

As further shown, in such interfitting of the finger portions 22 on the coupling sleeves 18, the finger portions are only brought into axial interfitting such that the hook parts 26 slightly axially overlap with the remainder of the voids 24 between the finger portions of both coupling sleeves remaining open. This, however, with the hook parts 26 of the finger portions 22 generally circumferentially and radially aligned produces a continuous annular opening within the interfitting finger portions in which is positioned a preferably split wire retention ring 28. Thus, the ends 14 and 16 of the pipe lengths 10 and 12 are retained axially together properly coupled against axial separation.

The unique coupling is completed by a cover sleeve 30 preferably formed of resilient material and axially telescoping the ends 14 and 16 of the pipe lengths 10 and 12. The cover sleeve 30 preferably extends axially from beyond the coupling sleeves 18 completely over such coupling sleeves and over the retained hook-shaped finger portions 22 so as to span the entire axial distance between the ends. The cover sleeve 30 is retained fluid-tight over the ends 14 and 16 by usual metal clamping rings 32, preferably two inwardly against each of such ends.

Usual fluid take-offs, in this case, water take-offs, may be secured communicating through the cover sleeve 30. As shown, a take-off 34 may be molded in the cover sleeve 30 at a location extending generally vertically upwardly for reception and mounting of a usual water sprinkler 36, shown in phantom lines in FIG. 1, and a take-off for a usual drain 38 may be molded in the cover sleeve extending generally downwardly for draining water from the pipe lengths 10 and 12 prior to disassembly of the coupling construction. Most importantly, when the coupling contruction is completed as described, the voids 24 between the finger portions 22 of the coupling sleeves 18 remain radially open a considerable distance beyond the hook parts 26 of the finger portions so as to establish fluid or water flow communication from the interiors of the pipe lengths 10 radially outwardly to the take-off 34 and the drain 38 where such are installed in the cover sleeve 30.

In the pipe and coupling construction of the present invention for particularly adapting the same to irrigation installations, the pipe lengths 10 are preferably formed of relatively light materials such as aluminum, molded plastic or fiberglass reinforced molded plastic. For a coupling of reasonable strength and to provide the torque resistance, the coupling sleeves 18 are formed of metal, and for corrosion resistance as well as strength of the hook-shaped finger portions 22, such sleeves are formed of stainless steel. If the pipe lengths 10 and 12 are of aluminum, the stainless steel coupling sleeves 18 would be force pressed therein and if the pipe lengths are of molded plastic, the stainless steel coupling sleeves could be cemented, or more preferably molded thereto as shown.

The retention ring 28 would also preferably be formed of stainless steel for corrosion resistance and as previously stated, the cover sleeve 30 is preferably formed of a resilient material such as one of the appropriate resilient plastics. The particular material of the cover sleeve 30 would, of course, depend on the fluids to be transmitted through the pipe lengths 10 and 12. Finally, the take-offs 34 and 38 may be of usual metal materials and may be molded into the cover sleeve 30 as shown or clamped thereon in usual manner, all well known to those skilled in the art.

Figure 4:
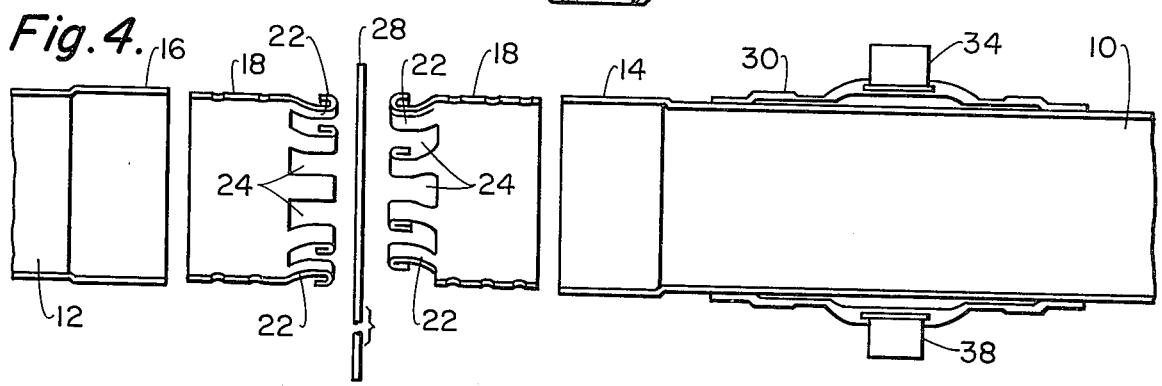
FIGS. 4, 5 and 6 are fragmentary, somewhat diagrammatic vertical sectional views similar to FIG. 3, but showing the progressive steps of the assembly of the pipe and coupling construction of the present invention.
Figure 5:
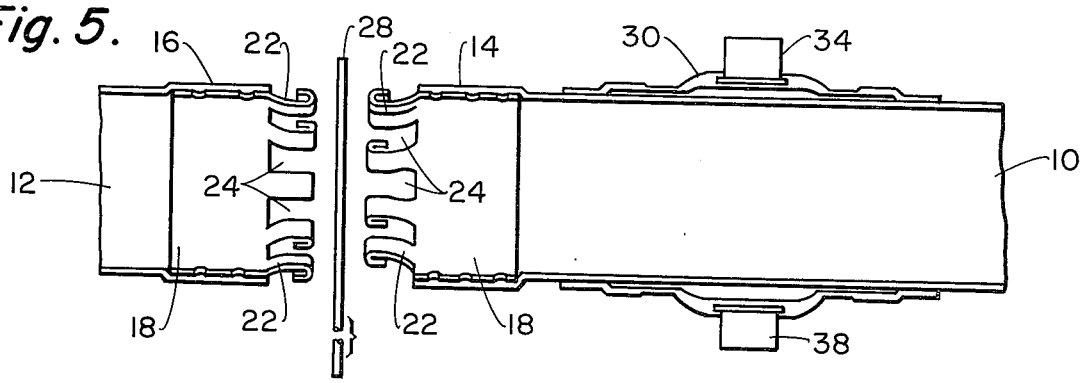
Figure 6:
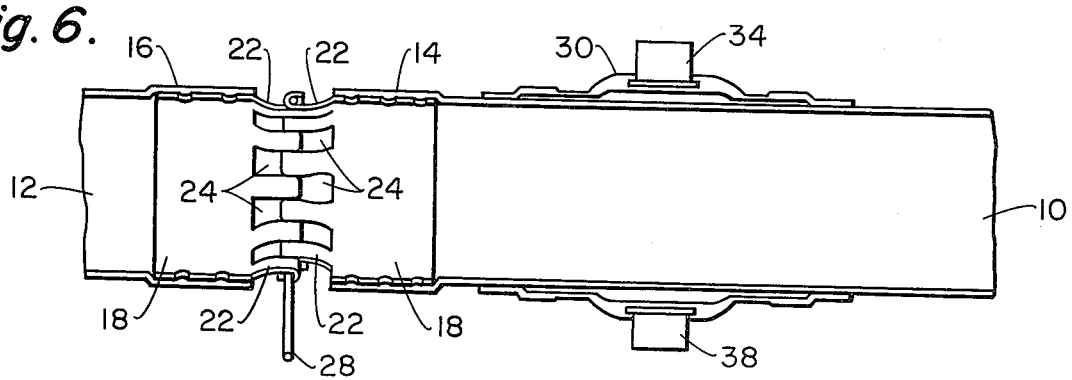

A typical assembly procedure for the embodiment of pipe and coupling construction of the present invention illustrated herein is shown in FIGS. 4, 5 and 6, the completed assembly being shown in FIG. 3. With the various elements separate and the cover sleeve 30 telescoped over one of the pipe lengths such as the pipe length 10 as shown in FIG. 4, the coupling sleeves 18 are telescoped by the ends 14 and 16 of the pipe lengths 10 and 12 with such ends being molded thereto for securement as shown in FIG. 5. The ends 14 and 16 are then brought axially together into general alignment interfitting the hook-shaped finger portions 24 of the coupling sleeves 18 and the retention ring 28 is inserted as shown in FIG. 6 and hereinbefore described. The cover sleeve 30 is then axially positioned axially covering the entire coupling and the clamping rings 32 properly affixed to produce the final operable assembly of FIG. 3. Where the pipe lengths are to be used in the previously referred to irrigation moving pipe system, the ultimately transporting wheels (not shown) may be assembled in place at appropriate times during the pipe coupling operation in the usual manner.

The disassembly of the construction is merely the reverse series of steps with the exception that the coupling sleeves 18 are, of course, not separated from the ends 14 and 16 of the pipe lengths 10 and 12. Thus, with disassembly, the various pipe lengths, such as the pipe lengths 10 and 12, making up an entire fluid distribution system such as an irrigation system, may be conveniently transported to the site of installation. Once positioned in the desired axial aligned relationships for the desired distribution, the couplings may be quickly assembled and the system is ready for operation. Obviously, the assembly and disassembly procedures are quite simple and require a minimum time of accomplishment, while with the particular form of coupling including the interfitting hook-shaped finger portions 22 of the coupling sleeves 18 and the preferably resilient cover sleeve 30, it is equally obvious that perfect axial alignment of the various pipe lengths 10 and 12 is not required and moderate flexibility is provided, while still producing the unique fluid-tight coupling.

In view of the particular form of coupling with the interfitting hook-shaped finger portions 22 of the coupling sleeves 18 and the fact that all of the pipe lengths will have the exact same coupling sleeves, the pipe lengths are completely interchangeable, all capable of producing the same unique strong torque resisting and flexible coupling construction, highly desirable for irrigation moving pipe systems. At the same time, due to this same construction feature, the various pipe lengths may be conveniently brought into coupling position at any circumferential position, one relative to the other, so that rotation of the pipe lengths during the coupling operations is completely unnecessary. The only question of alignment circumferentially during assembly is that of the cover sleeves 30 where take-offs 34 and 36 for elements such as sprinklers 36 and/or drains are installed in the particular cover sleeves, in which case, the cover sleeves would be properly rotated about the pipe lengths to establish the desired positioning.

I claim:

1. In a pipe and coupling construction, the combination of: two pipes having generally axially aligned and axially facing ends; metal coupling sleeves partially telescoped with and secured to said pipe ends having circumferentially spaced and axially extending finger portions generally hook-shaped in radial cross-section, said hook-shaped finger portions of said coupling sleeves circumferentially interfitting generally circumferentially aligned; a retention ring through said hook-shaped finger portions of said coupling sleeves retaining said finger portions against axial and radial separation; a cover sleeve telescoping said pipe ends axially over said coupling sleeves and said hook-shaped finger portions of said coupling sleeves; clamping means retaining said cover sleeve in said telescoping position, fluid flow voids are formed circumferentially between said coupling sleeve finger portions by said finger portion circumferential spacing remaining radially open axially adjacent certain of said finger portions after said circumferential interfitting and said circumferential alignment of said finger portions; and in which a fluid takeoff member is secured in said cover sleeve, and provides a fluid communicating passage there through, said take-off member freely fluid communicating with interiors of said pipes through said fluid flow voids.

2. In pipe and coupling construction as defined in claim 1 in which said pipes are non-metallic pipes; and in which said metal coupling sleeves are secured to said pipe ends by molding said pipe ends to said coupling sleeves.

3. In pipe and coupling construction as defined in claim 1 in which said cover sleeve is a resilient material cover sleeve; and in which said clamping means includes clamping rings telescoping said cover sleeve.

4. In pipe and coupling construction as defined in claim 1 in which said cover sleeve is a resilient material cover sleeve; and in which said fluid take-off member is molded to and fluid communicating through said cover sleeve.

5. In pipe and coupling construction as defined in claim 1 in which at least two fluid take-off members are secured in and provide a fluid communicating passage through said cover sleeve.

6. In pipe and coupling construction as defined in claim 1 in which said pipes are non-metallic pipes; in which said metal coupling sleeves are secured to said pipe ends by molding said pipe ends to said coupling sleeves; in which said cover sleeve is a resilient material cover sleeve; and in which at least two fluid take-off members are secured to and fluid communicating through said cover sleeve.

* * * * *